United States Patent
Ikeda

(10) Patent No.: US 8,659,202 B2
(45) Date of Patent: Feb. 25, 2014

(54) STATOR FOR ELECTRIC ROTATING MACHINE

(75) Inventor: Kazumasa Ikeda, Anjo (JP)

(73) Assignee: Denso Corporation, Kariya (JP)

( * ) Notice: Subject to any disclaimer, the term of this patent is extended or adjusted under 35 U.S.C. 154(b) by 68 days.

(21) Appl. No.: 13/524,441

(22) Filed: Jun. 15, 2012

(65) Prior Publication Data

US 2012/0319522 A1    Dec. 20, 2012

(30) Foreign Application Priority Data

Jun. 17, 2011   (JP) .................................. 2011-134895

(51) Int. Cl.
*H02K 3/28*    (2006.01)

(52) U.S. Cl.
USPC .......................... 310/201; 310/179; 310/198

(58) Field of Classification Search
USPC .......................... 310/179, 198, 200–208, 210
See application file for complete search history.

(56) References Cited

U.S. PATENT DOCUMENTS

| | | | |
|---|---|---|---|
| 6,181,043 B1 * | 1/2001 | Kusase et al. ................. | 310/201 |
| 6,181,045 B1 * | 1/2001 | Umeda et al. ................. | 310/201 |
| 6,388,358 B1 * | 5/2002 | Umeda et al. ................. | 310/201 |
| 6,459,177 B1 * | 10/2002 | Nakamura et al. ..... | 310/216.136 |
| 6,501,206 B2 * | 12/2002 | Oohashi et al. ............... | 310/184 |
| 7,268,455 B2 * | 9/2007 | Kouda et al. .................. | 310/184 |
| 7,521,828 B2 * | 4/2009 | Ogawa et al. .................. | 310/71 |
| 7,726,007 B2 * | 6/2010 | Kato et al. ..................... | 29/598 |
| 7,759,835 B2 | 7/2010 | Inderka et al. | |
| 2006/0214522 A1 * | 9/2006 | Kawano ......................... | 310/59 |
| 2008/0191574 A1 * | 8/2008 | Tokizawa ...................... | 310/179 |

FOREIGN PATENT DOCUMENTS

| | | |
|---|---|---|
| JP | 4412330 | 11/2009 |
| JP | 2011-172384 | 9/2011 |

* cited by examiner

*Primary Examiner* — Tran Nguyen
*Assistant Examiner* — Naishadh Desai
(74) *Attorney, Agent, or Firm* — Nixon & Vanderhye PC

(57) ABSTRACT

A stator includes a stator core and a stator coil comprised of a plurality of electric conductor segments mounted on the stator core. Each of the electric conductor segments has an insulating coat-removed portion. Each corresponding pair of the insulating coat-removed portions of the electric conductor segments are joined with a joint formed therebetween. Each of the electric conductor segments also has an oblique portion that is comprised of a first part and a second part. The first and second parts extend, along the circumferential direction of the stator core, obliquely with respect to an axial end face of the stator core respectively at first and second oblique angles $\theta_1$ and $\theta_2$, where $\theta_2 > \theta_1$. The second part is positioned closer to the joint, where the insulating coat-removed portion of the electric conductor segment is jointed to that of another electric conductor segment, than the first part is.

8 Claims, 8 Drawing Sheets (1ST EMBODIMENT)

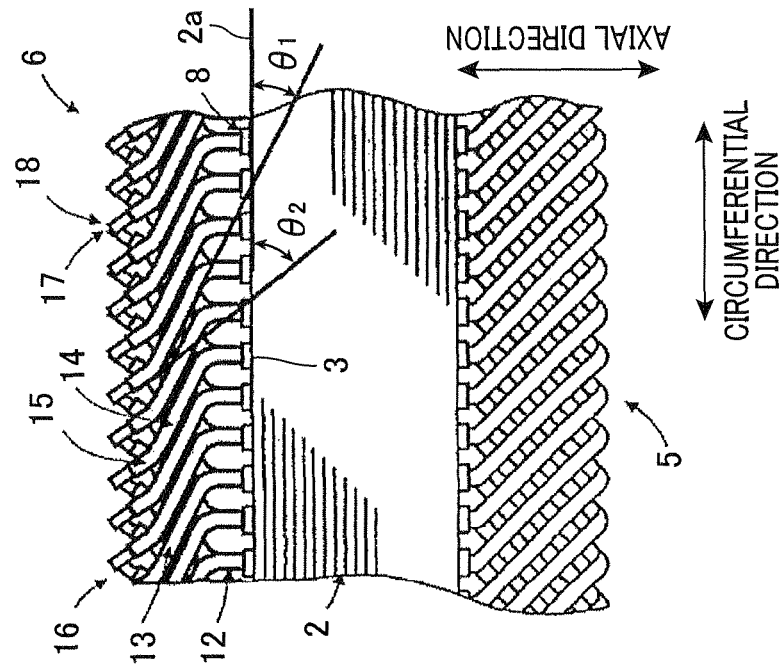
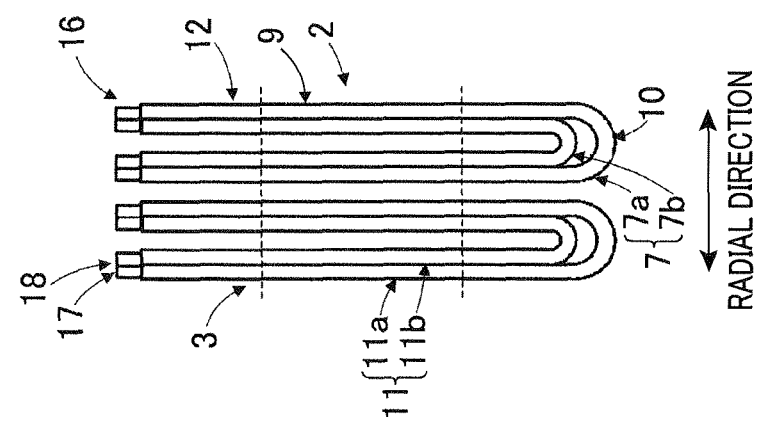

(1ST EMBODIMENT)

(1ST EMBODIMENT)

(COMPARATIVE EXAMPLE)

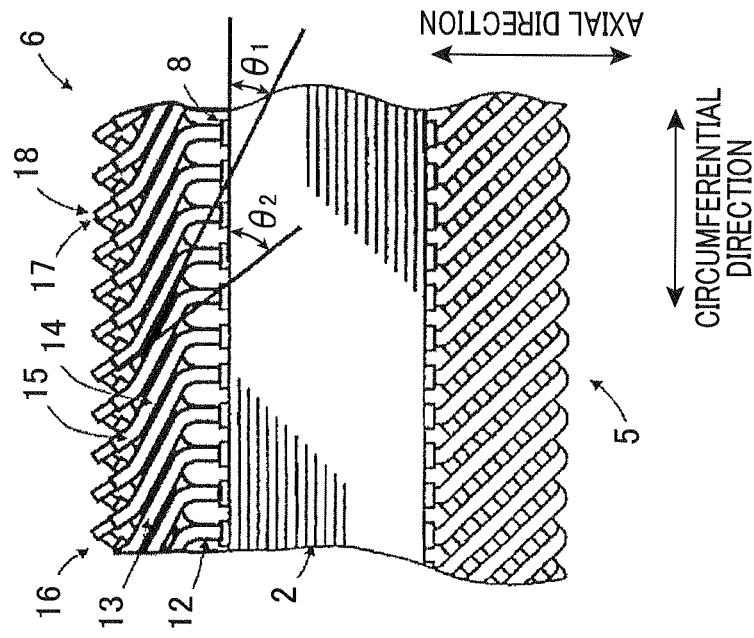
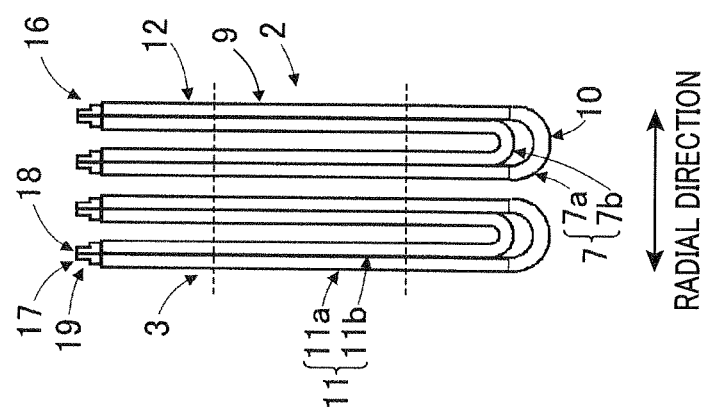

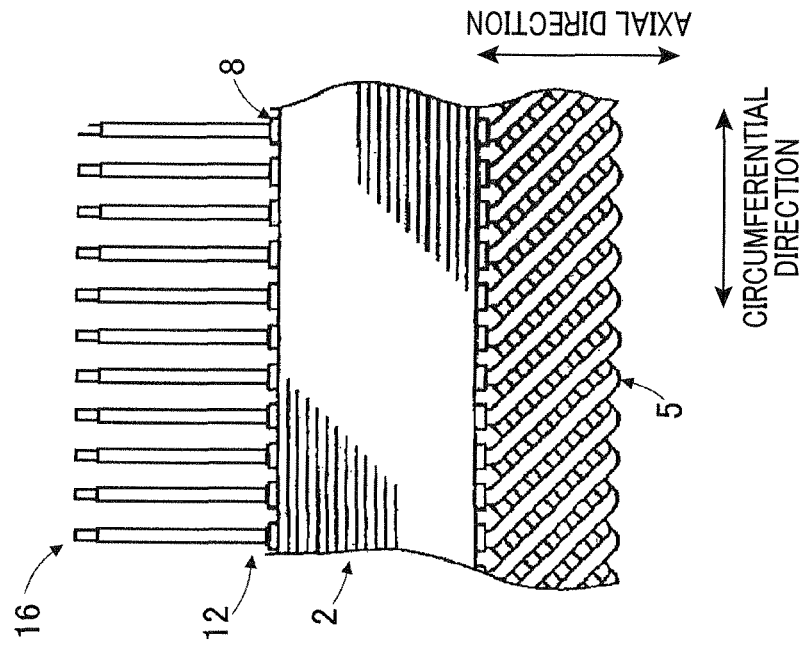
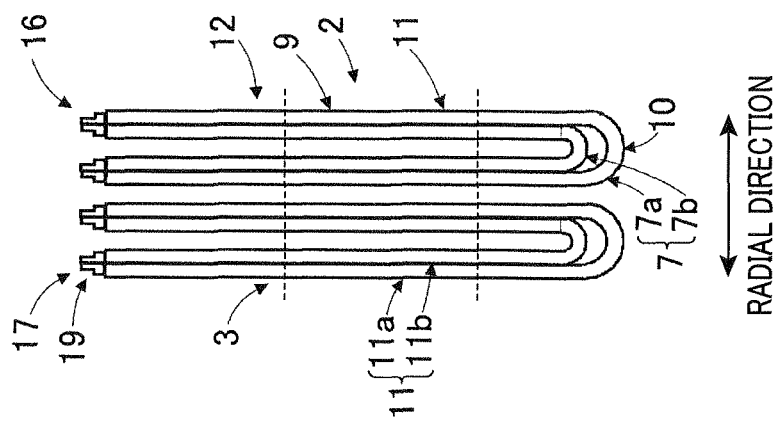

STATOR FOR ELECTRIC ROTATING MACHINE

CROSS-REFERENCE TO RELATED APPLICATION

This application is based on and claims priority from Japanese Patent Application No. 2011-134895, filed on Jun. 17, 2011, the content of which is hereby incorporated by reference in its entirety into this application.

BACKGROUND

1. Technical Field

The present invention relates generally to stators for electric rotating machines that are used in, for example, motor vehicles as electric motors and electric generators, and more particularly to stators which include a stator core and a segment-type stator coil mounted on the stator core. Hereinafter, the term "a segment-type stator coil" denotes a stator coil which is comprised of a plurality of electric conductor segments.

2. Description of Related Art

There are known stators for electric rotating machines which include a segment-type stator coil for improving the space factors of the stator coil in slots of a stator core of the stator.

For example, Japanese Patent Application Publication No. 2008-199751 (to be simply referred to as Patent Document 1 hereinafter) discloses a stator which includes an annular stator core and a stator coil comprised of a plurality of substantially U-shaped electric conductor segments.

The stator core has a plurality of slots that are formed in the radially inner surface of the stator core and arranged at predetermined intervals in the circumferential direction of the stator core. Each of the slots extends in the axial direction of the stator core so as to penetrate the stator core in the axial direction.

Each of the electric conductor segments is substantially U-shaped to include a pair of straight portions that extend parallel to each other and a turn portion that connects ends of the straight portions on the same side.

In forming the stator coil, the straight portions are first axially inserted, from one axial side of the stator core, respectively into corresponding two of the slots of the stator core; the corresponding two slots are separated from each other by a predetermined pitch (e.g., a predetermined number of the slots).

Then, according to one embodiment of Patent Document 1, for each of the straight portions, a free end part of the straight portion, which protrudes outside of the corresponding slot on the other axial side of the stator core, is bent to form an oblique portion of the electric conductor segment. The oblique portion extends, along the circumferential direction of the stator core, obliquely at a predetermined angle with respect to the corresponding axial end face of the stator core. The oblique portion has a distal end part from which an insulating coat (or insulating film) that covers the electric conductor segment is removed; thus, the distal end part makes up an insulating coat-removed portion of the electric conductor segment.

Thereafter, each corresponding pair of the insulating coat-removed portions of the electric conductor segments, which are radially adjacent to each other, are joined, for example by welding, to form a joint therebetween. Consequently, the electric conductor segments are electrically connected to one another, thereby forming the segment-type stator coil.

With the above formation of the stator coil, all the oblique portions of the electric conductor segments together make up a coil end of the stator coil on the other axial side of the stator core. Further, to reduce the protruding height of the coil end (i.e., the oblique portions) from the corresponding axial end face of the stator core, it is necessary to reduce the predetermined angle between the oblique portions of the electric conductor segments and the corresponding axial end face of the stator core. However, with reduction in the predetermined angle, the distance between each circumferentially-adjacent pair of the joints formed between the insulating coat-removed portions of the electric conductor segments is accordingly reduced, thereby making it difficult to ensure electrical insulation between the electric conductor segments.

Moreover, with reduction in the predetermined angle, for each of the joints formed between the insulating coat-removed portions of the electric conductor segments, the distances from the joint to those oblique portions of the electric conductor segments which are circumferentially adjacent to the joint are also accordingly reduced. Therefore, the insulating coats that cover those oblique portions of the electric conductor segments may be thermally degraded by the heat input for the formation of the joint by welding. Consequently, the thermal degradation of the insulating coats may also make it difficult to ensure electrical insulation between the electric conductor segments.

On the other hand, according to another embodiment of Patent Document 1, for each of the straight portions, a free end part of the straight portion, which protrudes outside of the corresponding slot on the other axial side of the stator core, is bent to form an oblique portion, an axially-extending end portion and a bent portion of the electric conductor segment. The oblique portion extends, along the circumferential direction of the stator core, obliquely at a predetermined angle with respect to the corresponding axial end face of the stator core. The axially-extending end portion is formed at the distal end of the free end part of the straight portion so as to extend in the axial direction of the stator core (i.e., perpendicular to the corresponding axial end face of the stator core). The bent portion is formed in the shape of a circular arc between the oblique portion and the axially-extending end portion. Further, from the axially-extending end portion, the insulating coat that covers the electric conductor segment is removed; thus, the axially-extending end portion makes up an insulating coat-removed portion of the electric conductor segment. Furthermore, each corresponding pair of the insulating coat-removed portions of the electric conductor segments, which are radially adjacent to each other, are joined, for example by welding, to form a joint therebetween. Consequently, the electric conductor segments are electrically connected to one another, thereby forming the segment-type stator coil.

However, with the above formation of the stator coil, for each of the electric conductor segments, the cross-sectional shape of the electric conductor segment at the bent portions thereof is deformed into a trapezoidal shape. Therefore, to prevent interference between those of the electric conductor segments which are aligned with each other in a radial direction of the stator core, it is necessary to provide additional radial spaces between those electric conductor segments. Consequently, it may be difficult to minimize the size of the stator.

Moreover, each pair of the electric conductor segments to be joined together are arranged so as to radially overlap each other both at the corresponding axially-extending end portions and at the corresponding bent portions thereof. Therefore, in joining the pair of the electric conductor segments, it is necessary to move, using a special jig, the corresponding insulating coat-removed portions (i.e., the corresponding axially-extending end portions) of the electric conductor segments toward each other by a distance equal to the thickness of the insulating coats of the electric conductor segments. Accordingly, it is necessary to secure an additional space in the stator for arranging the special jig, thereby making it difficult to minimize the size of the stator.

U.S. Pat. No. 7,759,835 B2 (to be simply referred to as Patent Document 2 hereinafter) discloses a stator which includes a stator core having a plurality of slots formed therein and a stator coil comprised of a plurality of substantially S-shaped electric conductor segments mounted on the stator core.

Specifically, according to the disclosure of Patent Document 2, before being inserted into a corresponding one of the slots of the stator core, each of the electric conductor segments is first bent into an L-shape, resulting in a long leg and a first short leg. Then, the long leg of the L-shaped electric conductor segment is inserted into the corresponding slot of the stator core. After the insertion, the electric conductor segment is further bent into a substantially S-shape, resulting in a second short leg while reducing the length of the long leg. The first short leg of each one of a majority of the electric conductor segments is then welded to the first short leg of another one of the electric conductor segments on one axial side of the stator core. The second short leg of each one of a majority of the electric conductor segments is then welded to the second short leg of another one of the electric conductor segments on the other axial side of the stator core. As a result, the segment-type stator coil is obtained.

However, with the above formation of the stator coil, it is necessary to perform the task of welding the electric conductor segments on both axial sides of the stator core, thereby complicating the manufacturing process of the stator.

Further, to reduce the protruding heights of the first and second short legs of the electric conductor segments from the corresponding axial end faces of the stator core, it is necessary to reduce the angles between the first and second short legs of the electric conductor segments and the corresponding axial end faces of the stator core. However, with reduction in the angles, the distance between each circumferentially-adjacent pair of the welds formed between the electric conductor segments is accordingly reduced, thereby making it difficult to ensure electrical insulation between the electric conductor segments.

Moreover, with reduction in the angles, for each of the welds formed between the electric conductor segments, the distances from the weld to those first or second short legs of the electric conductor segments which are circumferentially adjacent to the weld are also reduced. Therefore, insulating coats that cover those first or second short legs of the electric conductor segments may be thermally degraded by the heat input for the formation of the weld. Consequently, the thermal degradation of the insulating coats may also make it difficult to ensure electrical insulation between the electric conductor segments.

SUMMARY

According to an exemplary embodiment, there is provided a stator for an electric rotating machine which includes a hollow cylindrical stator core and a stator coil. The stator core has a plurality of slots formed therein. The slots are spaced from one another in a circumferential direction of the stator core and each extend in an axial direction of the stator core so as to penetrate the stator core in the axial direction. The stator coil is comprised of a plurality of electric conductor segments mounted on the stator core. Each of the electric conductor segments has an insulating coat covering its outer surface and includes, at least, an in-slot portion and an oblique portion. The in-slot portion is received in a corresponding one of the slots of the stator core. The oblique portion is connected to the in-slot portion and located outside of the slots of the stator core. Moreover, the oblique portion is positioned axially outside of an axial end face of the stator core and extends obliquely with respect to the axial end face. Each of the electric conductor segments also has an insulating coat-removed portion from which the insulating coat is removed. The insulating coat-removed portion is positioned on the same axial side of the stator core as the oblique portion of the electric conductor segment. Each corresponding pair of the insulating coat-removed portions of the electric conductor segments are joined with a joint formed therebetween. For each of the electric conductor segments, the oblique portion of the electric conductor segment is comprised of a first part and a second part. The first part extends, along the circumferential direction of the stator core, obliquely with respect to the axial end face of the stator core with a first oblique angle $\theta_1$ formed between the first part and the axial end face. The second part extends, along the circumferential direction of the stator core, obliquely with respect to the axial end face of the stator core with a second oblique angle $\theta_2$ formed between the second part and the axial end face. The second oblique angle $\theta_2$ is greater than the first oblique angle $\theta_1$. The second part is positioned closer to the joint, where the insulating coat-removed portion of the electric conductor segment is jointed to the insulating coat-removed portion of another electric conductor segment, than the first part is.

With the above two-part formation of each of the oblique portions of the electric conductor segments, it is possible to secure a sufficiently long distance between each circumferentially-adjacent pair of the joints formed between the insulating coat-removed portions of the electric conductor segments, thereby reliably ensuring electrical insulation between the electric conductor segments. Moreover, it is also possible to minimize the protruding height of a coil end of the stator coil from the axial end face of the stator core by suitably setting the first and second oblique angles $\theta_1$ and $\theta_2$.

Preferably, in each of the electric conductor segments, the second part of the oblique portion is positioned to include a distal end of the electric conductor segment, and the insulating coat-removed portion is formed at the distal end of the electric conductor segment.

Preferably, for each of the oblique portions of the electric conductor segments, the first part of the oblique portion crosses over, at a crossover area, the first part of another one of the oblique portions of the electric conductor segments which is radially adjacent to the oblique portion.

It is further preferable that in each of the electric conductor segments, the insulating coat-removed portion is formed so as to be away from the crossover area.

It is still further preferable that in each of the electric conductor segments, the insulating coat-removed portion is formed only within the second part of the oblique portion.

Preferably, each pair of the electric conductor segments which are jointed together at the insulating coat-removed portions thereof are in contact with each other only at the insulating coat-removed portions.

Preferably, each of the electric conductor segments is substantially U-shaped to include a pair of in-slot portions and a pair of oblique portions. The in-slot portions are respectively received in corresponding two of the slots of the stator core.

The oblique portions are respectively connected to the in-slot portions and both located on the same axial side of the stator core.

Preferably, each of the electric conductor segments has a substantially rectangular cross-sectional shape. Each of the insulating coat-removed portions of the electric conductor segments has a smaller radial thickness at a part thereof for forming the joint than at the remaining part.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings:

FIG. 2A is a schematic view illustrating electric conductor segments mounted on a stator core of the stator, the electric conductor segments together making up a stator coil of the stator;

FIG. 2B is a side view of part of the stator;

FIG. 6A is a schematic view illustrating electric conductor segments mounted on a stator core of a stator according to a second embodiment, the electric conductor segments together making up a stator coil of the stator;

FIG. 6B is a side view of part of the stator according to the second embodiment;

FIG. 7A is a schematic view illustrating the electric conductor segments according to the second embodiment after being inserted in slots of the stator core and before being bent to form oblique portions of the electric conductor segments;

FIG. 7B is a side view illustrating the electric conductor segments according to the second embodiment after being inserted in the slots and before being bent to form the oblique portions;

DESCRIPTION OF EMBODIMENTS

Figure 1:
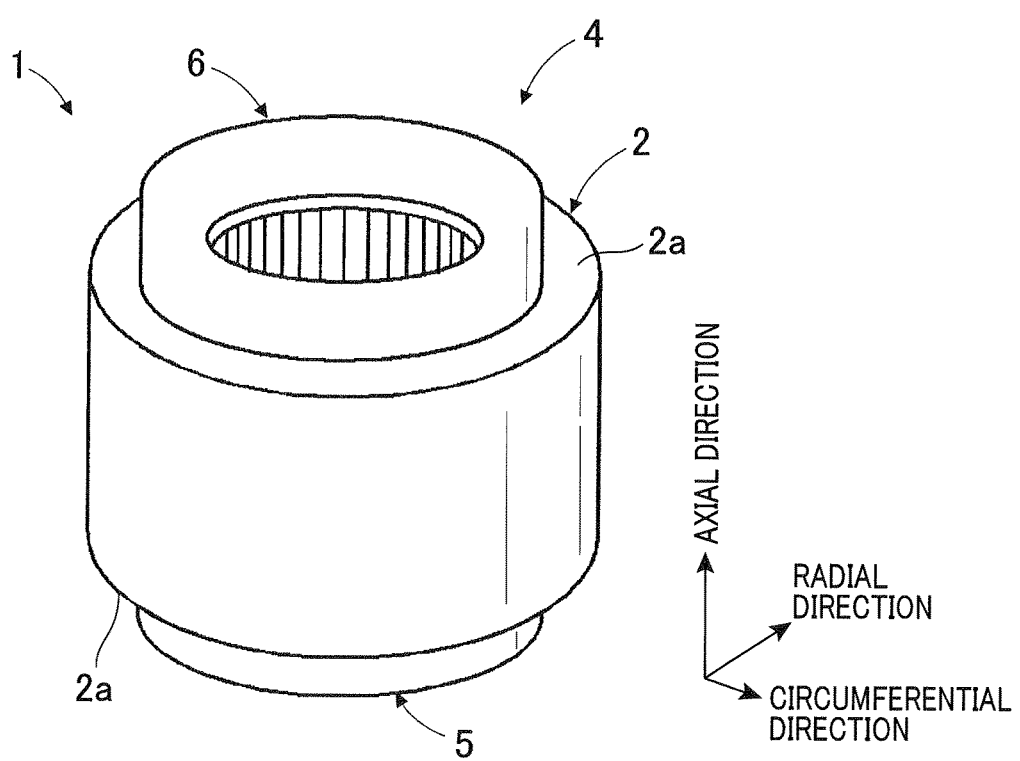
FIG. 1 is a schematic perspective view of a stator according to a first embodiment.

Exemplary embodiments will be described hereinafter with reference to FIGS. 1-8B. It should be noted that for the sake of clarity and understanding, identical components having identical functions in different embodiments have been marked, where possible, with the same reference numerals in each of the figures and that for the sake of avoiding redundancy, descriptions of the identical components will not be repeated.

First Embodiment

FIG. 1 shows the overall configuration of a stator 1 according to a first embodiment. The stator 1 is designed to be used in an automotive electric motor.

As shown in FIG. 1, the stator 1 includes a hollow cylindrical stator core 2 having a plurality of slots 3 formed therein and a three-phase stator coil 4 that is mounted on the stator core 2 so as to be inserted in the slots 3 of the stator core 2.

The slots 3 are formed in the radially inner surface of the stator core 2 so as to be spaced from one another at equal intervals in the circumferential direction of the stator core 2. Each of the slots 3 extends in the axial direction of the stator core 2 so as to axially penetrate the stator core 2 in the axial direction. In addition, for each of the slots 3, the depth-wise direction of the slot 3 coincides with a radial direction of the stator core 2.

The stator coil 4 is partially received in the slots 3 of the stator core 2 so as to have first and second coil ends 5 and 6. The first coil end 5 protrudes from one axial end face 2a of the stator core 2, while the second coil end 6 protrudes from the other axial end face 2a of the stator core 2.

In the present embodiment, the stator coil 4 is comprised of a plurality of electric conductor segments 7 mounted on the stator core 2.

Specifically, in each of the slots 3 of the stator core 2, there are received a predetermined even number (e.g., eight in the present embodiment) of the electric conductor segments 7 so as to be aligned with each other in the radial direction of the stator core 2 (or in the depth-wise direction of the slot 3). In addition, as shown in FIG. 2B, for each of the slots 3, there is provided insulating paper 8 to electrically insulate the electric conductor segments 7 received in the slot 3 from the stator core 2.

In the present embodiment, the electric conductor segments 7 are each substantially U-shaped and joined to one another to form the stator coil 4.

Figure 3B:
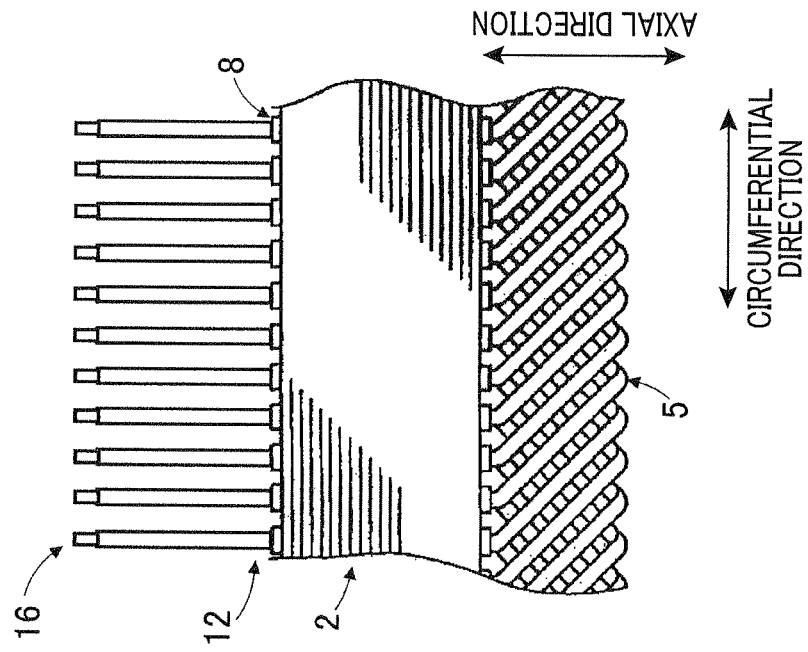
FIG. 3B is a side view illustrating the electric conductor segments after being inserted in the slots and before being bent to form the oblique portions.
Figure 3A:
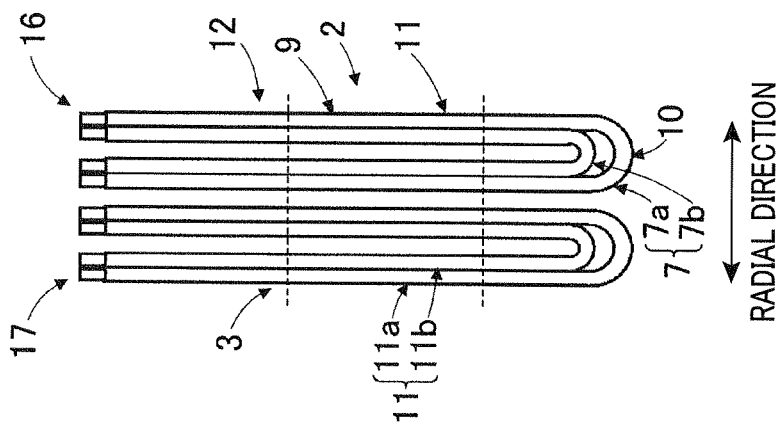
FIG. 3A is a schematic view illustrating the electric conductor segments after being inserted in slots of the stator core and before being bent to form oblique portions of the electric conductor segments.

Referring to FIG. 3A, each of the U-shaped electric conductor segments 7 is obtained by: (1) cutting an electric wire, which has a substantially rectangular cross section and an insulating coat (or insulating film) formed at the surface thereof, into an electric conductor segment of a predetermined length; (2) bending the electric conductor segment into a U-shape so as to have a pair of straight portions 9 that extend parallel to each other and a turn portion 10 that connects ends of the straight portions 9 on the same side; and (3) expanding the pair of straight portions 9 so as to be twisted at a predetermined position and in a predetermined direction.

Moreover, in the present embodiment, as shown in FIG. 3A, the electric conductor segments 7 are comprised of a plurality of pairs of large and small U-shaped electric conductor segments 7a and 7b; the small U-shaped electric conductor segment 7b is surrounded by the large U-shaped electric conductor segment 7a.

Referring to FIGS. 3A-3B, for each of the electric conductor segments 7, the straight portions 9 of the electric conductor segment 7 are axially inserted, from one axial side of the stator core 2, respectively into corresponding two of the slots 3 of the stator core 2; the corresponding two slots 3 are separated from each other in the circumferential direction of the stator core 2 by one magnetic pole pitch (or a given number of the slots 3). Those parts 11 of the straight portions 9 which are respectively received in the corresponding two slots 3 of the stator core 2 make up in-slot portions 11 of the electric conductor segment 7. On the other hand, those parts 12 of the straight portions 9 which respectively protrude outside of the corresponding two slots 3 on the other axial side of the stator core 2 are bent to form oblique portions 13 of the electric conductor segment 7. Each of the oblique portions 13 extends in both the axial and circumferential directions of the stator core 2, as shown in FIG. 2B.

More specifically, for each of the electric conductor segments 7, one of the two oblique portions 13 of the electric conductor segment 7, which is positioned on the front side in the direction perpendicular to the paper surface of FIG. 2B, is bent so as to extend toward one circumferential side (i.e., toward the left side in FIG. 2B or clockwise). The other oblique portion 13, which is positioned on the rear side in the direction perpendicular to the paper surface of FIG. 2B, is bent so as to extend toward the other circumferential side (i.e., toward the right side in FIG. 2B or counterclockwise).

Further, in the present embodiment, as shown in FIG. 2B, each of the oblique portions 13 is formed in two parts, i.e., a first part 14 and a second part 15 that is positioned more distal than the first part 14 and includes a distal end 17 of the electric conductor segment 7. In other words, the second part 15 is positioned further from the corresponding axial end face 2a of the stator core 2 than the first part 14 is. The first part 14 extends, along the circumferential direction of the stator core 2, obliquely with respect to the corresponding axial end face 2a of the stator core 2 with a first oblique angle $\theta_1$ formed between the first part 14 and the corresponding axial end face 2a. The second part 15 extends, along the circumferential direction of the stator core 2, obliquely with respect to the corresponding axial end face 2a of the stator core 2 with a second oblique angle $\theta_2$ formed between the second part 15 and the corresponding axial end face 2a. The second oblique angle $\theta_2$ is set to be greater than the first oblique angle $\theta_1$ (i.e., $\theta_2 > \theta_1$).

Moreover, referring to FIGS. 2A-2B, at the distal end 17 of the second part 15 (i.e., the distal end 17 of the electric conductor segment 7), there is formed an insulating coat-removed portion 16 of the electric conductor segment 7. From the insulating coat-removed portion 16, the insulating coat of the electric conductor segment 7 is removed by means of a cutter or a chemical agent. The insulating coat-removed portion 16 is provided for welding the distal end 17 of the electric conductor segment 7 to a radially-adjacent one of the distal ends 17 of the other electric conductor segments 7.

Figure 4A:
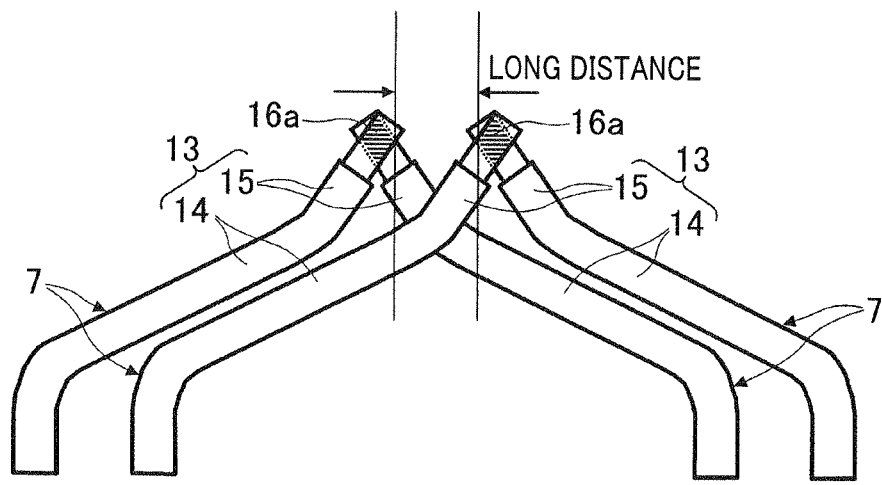
FIG. 4A is a schematic view illustrating an advantage of the stator according to the first embodiment.

More specifically, as shown in FIG. 4A, for each of the electric conductor segments 7, that oblique portion 13 of the electric conductor segment 7 which extends toward the one circumferential side is joined to that oblique portion 13 of another electric conductor segment 7 which extends toward the other circumferential side by welding the insulating coat-removed portions 16 which are respectively provided in the two oblique portions 13 of the electric conductor segments 7 and radially adjacent to each other. On the other hand, that oblique portion 13 of the electric conductor segment 7 which extends toward the other circumferential side is joined to that oblique portion 13 of yet another electric conductor segment 7 which extends toward the one circumferential side by welding the insulating coat-removed portions 16 which are respectively provided in the two oblique portions 13 of the electric conductor segments 7 and radially adjacent to each other. In addition, between each welded pair of the insulating coat-removed portions 16 of the electric conductor segments 7, there is formed a weld (or joint) 16a.

As described above, in the present embodiment, each of the oblique portions 13 of the electric conductor segments 7 is formed in two parts such that the second oblique angle $\theta_2$ of the second part 15 is greater than the first oblique angle $\theta_1$ of the first part 14. Consequently, as shown in FIG. 4A, with the two-part formation, it becomes possible to secure a sufficiently long distance between each circumferentially-adjacent pair of the welds 16a formed between the insulating coat-removed portions 16 of the electric conductor segments 7, thereby reliably ensuring electrical insulation between the electric conductor segments 7.

Figure 4B:
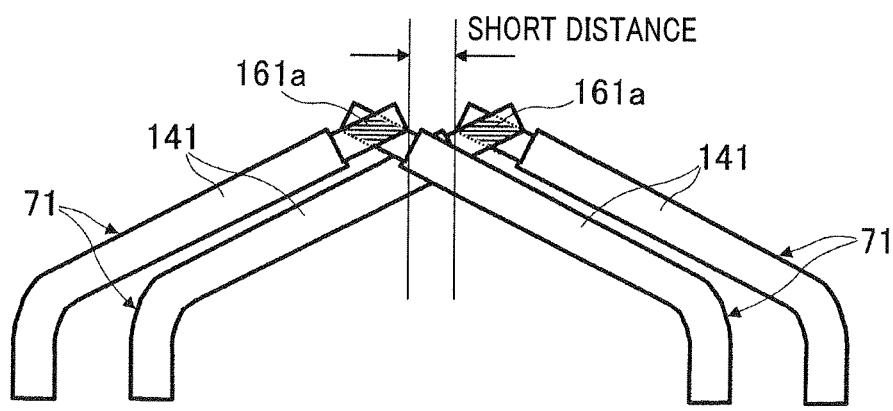
FIG. 4B is a schematic view illustrating a disadvantage of a stator according to the prior art.

In comparison, as shown in FIG. 4B, with the one-part formation of the oblique portions 141 of the electric conductor segments 71 according to the prior art (e.g., as disclosed in Patent Document 1), it is difficult to secure a sufficiently long distance between each circumferentially-adjacent pair of the welds 161a formed between the insulating coat-removed portions 161 of the electric conductor segments 71. Consequently, it may be difficult to reliably ensure electrical insulation between the electric conductor segments 71.

Figure 5A:
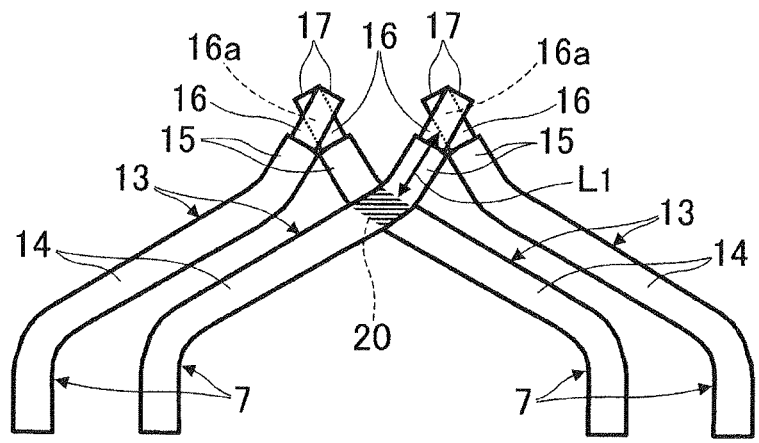
FIG. 5A is a schematic view illustrating another advantage of the stator according to the first embodiment.

Furthermore, in the present embodiment, as shown in FIG. 5A, for each of the oblique portions 13 of the electric conductor segments 7, the first part 14 of the oblique portion 13 crosses over, at a crossover area 20, the first part 14 of another one of the oblique portions 13 of the electric conductor segments 7 which is radially adjacent and extends toward the opposite circumferential side to the oblique portion 13.

Consequently, in each of the oblique portions 13 of the electric conductor segments 7, the second part 15 is interposed between the crossover area 20 where the oblique portion 13 crosses over another oblique portion 13 and the weld 16a where the oblique portion 13 is welded to yet another oblique portion 13. As a result, it becomes possible to secure a sufficiently long distance L1 between the crossover area 20 and the weld 16a.

Figure 5B:
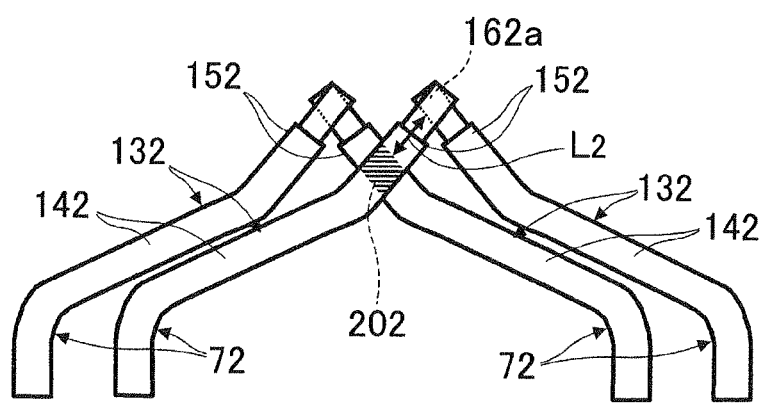
FIG. 5B is a schematic view illustrating a disadvantage of a stator according to a comparative example.

In contrast, in a comparative example shown in FIG. 5B, for each of the oblique portions 132 of the electric conductor segments 72, the second part 152 of the oblique portion 132 crosses over, at a crossover area 202, the second part 152 of another one of the oblique portions 132 of the electric conductor segments 72 which is radially adjacent and extends toward the opposite circumferential side to the oblique portion 132.

Consequently, in each of the oblique portions 132 of the electric conductor segments 72, the distance L2 from the crossover area 202 where the oblique portion 132 crosses over another oblique portion 132 to the weld 162a where the oblique portion 132 is welded to yet another oblique portion 132 is shorter than the distance L1 according to the present embodiment.

Referring back to FIG. 5A, in the present embodiment, in each of the oblique portions 13 of the electric conductor segments 7, the insulating coat-removed portion 16 is formed only within the second part 15 of the oblique portion 13 so as to be away from the crossover area 20 where the first part 14 of the oblique portion 13 crosses over the first part 14 of another oblique portion 13. That is, at the crossover area 20, the insulating coat is not removed from the oblique portion 13.

In the present embodiment, the plurality of pairs of large and small U-shaped electric conductor segments 7a and 7b are sequentially mounted to the stator core 2. The manner of mounting the electric conductor segments 7a and 7b into the radially inner halves of the slots 3 of the stator core 2 is the same as the manner of mounting those into the radially outer halves of the slots 3. Therefore, for the sake of avoiding redundancy, only the manner of mounting the electric conductor segments 7a and 7b into the radially inner halves of the slots 3 will be described in detail hereinafter.

As described previously, those parts 11a of the straight portions 9 of the large electric conductor segments 7a which are respectively received in the corresponding slots 3 of the stator core 2 make up the in-slot portions 11a of the electric conductor segments 7a. Similarly, those parts 11b of the straight portions 9 of the small electric conductor segments 7b which are respectively received in the corresponding slots 3 of the stator core 2 make up the in-slot portions 11b of the electric conductor segments 7b.

On the one axial side of the stator core 2, that in-slot portion 11a of one of the electric conductor segments 7a which is inserted in an inside layer of a first one of the slots 3 is connected, by the turn portion 10 of the electric conductor segment 7a, to that in-slot portion 11a of the electric conductor segment 7a which is inserted in an outside layer of a second one of the slots 3; the second slot 3 is separated from the first slot 3 clockwise by one magnetic pole pitch. Moreover, that in-slot portion 11b of one of the electric conductor segments 7b which is inserted in an inside-center layer of the first slot 3 is connected, by the turn portion 10 of the electric conductor segment 7b, to that in-slot portion 11b of the electric conductor segment 7b which is inserted in an outside-center layer of the second slot 3.

Furthermore, in the same fashion as above, all the in-slot portions 11a inserted in the inside layers of the slots 3 are respectively connected to the in-slot portions 11a inserted in the outside layers of the slots 3 by the turn portions 10 of the electric conductor segments 7a; all the in-slot portions 11b inserted in the inside-center layers of the slots 3 are respectively connected to the in-slot portions 11b inserted in the outside-center layers of the slots 3 by the turn portions 10 of the electric conductor segments 7b.

Consequently, on the one axial side of the stator core 2, all the turn portions 10 of the large electric conductor segments 7a together form an axially outer layer of the first coil end 5 of the stator coil 4; all the turn portions 10 of the small electric conductor segments 7b together form an axially inner layer of the first coil end 5.

On the other axial side of the stator core 2, that in-slot portion 11b of the electric conductor segment 7b which is inserted in the inside-center layer of the first slot 3 is connected to that in-slot portion 11a of another one of the electric conductor segments 7a which is inserted in an inside layer of the second slot 3 by joining a corresponding pair of the oblique portions 13 of the two electric conductor segments 7a and 7b. Moreover, that in-slot portion 11a of yet another one of the electric conductor segments 7a which is inserted in an outside layer of the first slot 3 is connected to that in-slot portion 11b of the electric conductor segment 7b which is inserted in the outside-center layer of the second slot 3 by joining a corresponding pair of the oblique portions 13 of the two electric conductor segments 7a and 7b.

Furthermore, in the same fashion as above, all the in-slot portions 11b of the electric conductor segments 7b inserted in the inside-center layers of the slots 3 are respectively connected to the in-slot portions 11a of the electric conductor segments 7a inserted in the inside layers of the slots 3 by joining the corresponding pairs of the oblique portions 13 of the electric conductor segments 7a and 7b; all the in-slot portions 11a of the electric conductor segments 7a inserted in the outside layers of the slots 3 are respectively connected to the in-slot portions 11b of the electric conductor segments 7b inserted in the outside-center layers of the slots 3 by joining the corresponding pairs of the oblique portions 13 of the electric conductor segments 7a and 7b.

Consequently, on the other axial side of the stator core 2, all the joints (i.e., welds) 16a formed between the corresponding pairs of the oblique portions 13, which respectively connect the in-slot portions 11b inserted in the inside-center layers of the slots 3 to the in-slot portions 11a inserted in the inside layers of the slots 3, fall on a first imaginary circle to form a first layer of the coil end 6. The first layer is comprised of the corresponding pairs of the oblique portions 13 that respectively connect the in-slot portions 11b inserted in the inside-center layers of the slots 3 to the in-slot portions 11a inserted in the inside layers of the slots 3. Moreover, all the joints (i.e., welds) 16a formed between the corresponding pairs of the oblique portions 13, which respectively connect the in-slot portions 11a inserted in the outside layers of the slots 3 to the in-slot portions 11b inserted in the outside-center layers of the slots 3, fall on a second imaginary circle to form a second layer of the coil end 6. The second layer is comprised of the corresponding pairs of the oblique portions 13 that respectively connect the in-slot portions 11a inserted in the outside layers of the slots 3 to the in-slot portions 11b inserted in the outside-center layers of the slots 3. Here, the second imaginary circle is concentric with the first imaginary circle and has a greater diameter than the first imaginary circle. Therefore, the second layer of the coil end 6 is located radially outside of the first layer of the coil end 6. In addition, each of the joints 16a falling on the first imaginary circle is radially aligned with one of the joints 16a falling on the second imaginary circle.

Furthermore, as described previously, the electric conductor segments 7a and 7b are also mounted into the radially outer halves of the slots 3 of the stator core 2 in the same manner as being mounted into the radially inner halves of the slots 3. Therefore, on the other axial side of the stator core 2, there are also defined third and fourth imaginary circles on which the joints 16a formed between the corresponding pairs of the oblique portions 13 of the electric conductor segments 7a and 7b fall. The third and fourth imaginary circles are concentric with the first and second imaginary circles. The third imaginary circle has a greater diameter than the second imaginary circle and the fourth imaginary circle has a greater diameter than the third imaginary circle. Further, each joint 16a falling on any one of the first to the fourth imaginary circles is radially aligned with another three joints 16a that respectively fall on the other three imaginary circles. Moreover, on the other axial side of the stator core 2, there are also formed third and fourth layers of the coil end 6. The third layer is located radially outside of the second layer and the fourth layer is located radially outside of the third layer. That is, in the present embodiment, the coil end 6 is formed in four layers in the radial direction of the stator core 2.

In addition, in the present embodiment, in joining each corresponding pair of the oblique portions 13 of the electric conductor segments 7, the oblique portions 13 are brought into contact with each other only at the insulating coat-removed portions 16 thereof, without having the insulating coats of the oblique portions 13 in contact with each other.

Moreover, in the present embodiment, the pitch between every two circumferentially-adjacent distal end pairs 18 is equal to the pitch between the slots 3 of the stator core 2; each distal end pair 18 is comprised of two radially-adjacent distal ends 17 of the oblique portions 13 of the electric conductor segments 7 (see FIGS. 2A-2B). Therefore, it is possible to reliably keep all the circumferentially-adjacent distal end pairs 18 from making contact with each other, thereby ensuring electrical insulation therebetween.

Further, in the present embodiment, all the distal end pairs 18 are arranged to form first to fourth distal end pair rows that respectively fall on the first to the fourth imaginary circles described above. The first distal end pair row is positioned radially innermost, the fourth distal end pair row is positioned radially outermost, and the second and fourth distal end pair rows are positioned radially between the first and fourth distal end pair rows. For each distal end pair 18, the distal ends 17 of the pair that are radially adjacent to each other are welded to form the weld (or joint) 16a therebetween. In addition, as disclosed in Patent Document 1, the distal ends 17 of each distal end pair 18 may be welded by arc welding with two earth electrodes respectively attached to the first and fourth distal end pair rows.

Next, advantages of the stator 1 according to the present embodiment will be described.

As described above, in the present embodiment, the stator 1 includes the hollow cylindrical stator core 2 and the segment-type stator coil 4. The stator core 2 has the slots 3 that are formed in the radially inner surface of the stator core 2 so as to be equally spaced from one another in the circumferential direction of the stator core 2. Each of the slots 3 extends in the axial direction of the stator core 2 so as to penetrate the stator core 2 in the axial direction. The stator coil 4 is comprised of the U-shaped electric conductor segments 7 mounted on the stator core 2. Each of the electric conductor segments 7 has the insulating coat covering its outer surface and includes the pair of in-slot portions 11 and the pair of oblique portions 13. Each of the in-slot portions 11 is received in the corresponding slot 3 of the stator core 2. Each of the oblique portions 13 is connected to the corresponding in-slot portion 11 and located outside of the slots 3 of the stator core 2. Moreover, each of the oblique portions 13 is positioned axially outside of the corresponding axial end face 2a of the stator core 2 and extends obliquely with respect to the axial end face 2a. Moreover, each of the oblique portions 13 also has formed therein the insulating coat-removed portion 16 from which the insulating coat is removed. Each corresponding pair of the insulating coat-removed portions 16 of the electric conductor segments 7 are joined by welding to form the joint (or weld) 16a therebetween. Each of the oblique portions 13 of the electric conductor segments 7 is formed in two parts, i.e., the first and second parts 14 and 15. The first part 14 extends, along the circumferential direction of the stator core 2, obliquely with respect to the corresponding axial end face 2a of the stator core with the first oblique angle $\theta_1$ formed between the first part 14 and the corresponding axial end face 2a. The second part 15 extends, along the circumferential direction of the stator core 2, obliquely with respect to the corresponding axial end face 2a of the stator core 2 with the second oblique angle $\theta_2$ formed between the second part 15 and the corresponding axial end face 2a. The second oblique angle $\theta_2$ is greater than the first oblique angle $\theta_1$. The second part 15 is positioned closer to the joint 16a, where the insulating coat-removed portion 16 formed in the oblique portion 13 is jointed to that formed in another oblique portion 13, than the first part 14 is.

With the above two-part formation of each of the oblique portions 13 of the electric conductor segments 7, it is possible to secure a sufficiently long distance between each circumferentially-adjacent pair of the joints 16a formed between the insulating coat-removed portions 16 of the electric conductor segments 7, thereby reliably ensuring electrical insulation between the electric conductor segments 7. Moreover, it is also possible to minimize the protruding height of the coil end 6 of the stator coil 4 from the corresponding axial end face 2a of the stator core 2 by suitably setting the first and second oblique angles $\theta_1$ and $\theta_2$.

Further, in the present embodiment, for each of the oblique portions 13 of the electric conductor segments 7, the second part 15 of the oblique portion 13 is positioned to include the distal end 17 of the electric conductor segment 7; at the distal end 17, there is formed the insulating coat-removed portion 16.

With the above configuration, it is possible to easily form the second part 15 of the oblique portion 13 by bending. Moreover, it is also possible to easily form the insulating coat-removed portion 16 in the electric conductor segment 7.

In the present embodiment, for each of the oblique portions 13 of the electric conductor segments 7, the first part 14 of the oblique portion 13 crosses over, at the crossover area 20, the first part 14 of another one of the oblique portions 13 of the electric conductor segments 7 which is radially adjacent and extends toward the opposite circumferential side to the oblique portion 13.

With the above configuration, it is possible to secure a sufficiently long distance between the crossover area 20 where the oblique portion 13 crosses over another oblique portion 13 and the joint 16a where the oblique portion 13 is joined to yet another oblique portion 13. Consequently, it is possible to prevent the insulating coats of the two crossing-over oblique portions 13 from being thermally degraded by the heat input for the formation of the joint 16a by welding. As a result, it is possible to prevent electrical insulation between the electric conductor segments 7 from being deteriorated due to thermal degradation of the insulating coats.

In the present embodiment, in each of the oblique portions 13 of the electric conductor segments 7, the insulating coat-removed portion 16 is formed so as to be away from the crossover area 20 where the first part 14 of the oblique portion 13 crosses over the first part 14 of another oblique portion 13. That is, at the crossover area 20, the insulating coat is not removed from the oblique portion 13.

With the above formation, it is possible to ensure electrical insulation between the two crossing-over oblique portions 13 at the crossover area 20 where the distance between the two oblique portions 13 is shortest.

Further, in the present embodiment, the insulating coat-removed portion 16 is formed only within the second part 15 of the oblique portion 13.

With the above formation, it is possible to more reliably ensure electrical insulation between the two crossing-over oblique portions 13 at the crossover area 20.

In the present embodiment, each joined pair of the oblique portions 13 of the electric conductor segments 7 are in contact with each other only at the insulating coat-removed portions 16 thereof. That is, the insulating coats of the oblique portions 13 are not in contact with each other.

With the above configuration, it is possible to minimize the size of the stator coil 4 around the joint 16a formed between the oblique portions 13, thereby minimizing the size of the second coil end 6 of the stator coil 4. Moreover, in joining the oblique portions 13, it is unnecessary to use a special jig for moving the insulating coat-removed portions 16 toward each other by a distance equal to the thickness of the insulating coats of the oblique portions 13. Accordingly, it is also unnecessary to secure an additional space in the stator 1 for arranging such a special jig. As a result, it is possible to minimize the size of the stator 1.

In the present embodiment, each of the electric conductor segments 7 is substantially U-shaped to include the pair of in-slot portions 11, which are respectively received in the corresponding two slots 3 of the stator core 2, and the pair of oblique portions 13 that are respectively connected to the pair of in-slot portions 11 and both located on the same axial side of the stator core 2.

Consequently, unlike in the case of employing S-shaped electric conductor segments as disclosed in Patent Document 2, all the oblique portions 13 of the electric conductor segments 7 are jointed only on one axial side (i.e., on the same axial side) of the stator core 2. As a result, it is possible to simplify the manufacturing process of the stator 1.

In addition, as shown in FIG. 2B, in the present embodiment, for each of the oblique portions 13 of the electric conductor segments 7, the second oblique angle $\theta_2$ between the second part 15 of the oblique portion 13 and the corresponding axial end face 2a of the stator core 2 is greater than the first oblique angle $\theta_1$ between the first part 14 of the oblique portion 13 and the corresponding axial end face 2a, but less than 90°. In other words, the second part 15 of the oblique portion 13 is oblique to, but not perpendicular to the corresponding axial end face 2a of the stator core 2.

Consequently, compared to the case of the second oblique angle $\theta_2$ being equal to 90°, it is possible to reduce the protruding height of the second coil end 6 from the corresponding axial end face 2a of the stator core 2. Moreover, for each distal end pair 18, the contact between the two distal ends 17 of the pair is point contact, not surface contact as in the case of the second oblique angle $\theta_2$ being equal to 90°. Therefore, during the arc-welding of the oblique portions 13, it is easier for an electric arc to be transmitted from the contact point between the two distal ends 17.

Second Embodiment

This embodiment illustrates a stator 1 which has almost the same structure as the stator 1 according to the first embodiment; accordingly, only the differences therebetween will be described hereinafter.

In the previous embodiment, each of the electric conductor segments 7 has a substantially rectangular cross-sectional shape over its entire length. Moreover, each of the insulating coat-removed portions 16 of the electric conductor segments 7 has a constant radial thickness over the entire length of the insulating coat-removed portion 16 (see FIGS. 2A and 3A).

In comparison, in the present embodiment, as shown in FIGS. 6A-6B and 7A-7B, each of the electric conductor segments 7 also has a substantially rectangular cross-sectional shape over its entire length. However, each of the insulating coat-removed portions 16 of the electric conductor segments 7 has a cut 19 formed at a distal part thereof for forming the joint (or weld) 16a, so that the radial thickness of the distal part is smaller than that of the remaining part of the insulating coat-removed portion 16. In other words, the insulating coat-removed portion 16 has a smaller thickness at the distal part thereof than at the remaining part.

Consequently, as shown in FIGS. 6A and 7A, for each distal end pair 18, the sum of radial thicknesses of the two distal ends 17 of the pair is reduced; in other words, the total radial thickness of the distal end pair 18 is reduced. As a result, it becomes possible to secure sufficiently wide intervals between all the radially-adjacent distal end pairs 18, thereby keeping them from making contact with each other to ensure electrical insulation therebetween.

Moreover, with the reduced radial thickness of the distal parts of the insulating coat-removed portions 16 of the electric conductor segments 7, the radial thickness of the joints 16a formed between the insulating coat-removed portions 16 is also reduced. Consequently, it becomes possible to secure sufficiently wide intervals between all the radially-adjacent pairs of the joints 16a, thereby ensuring electrical insulation between the electrical conductor segments 7.

Figure 8A:
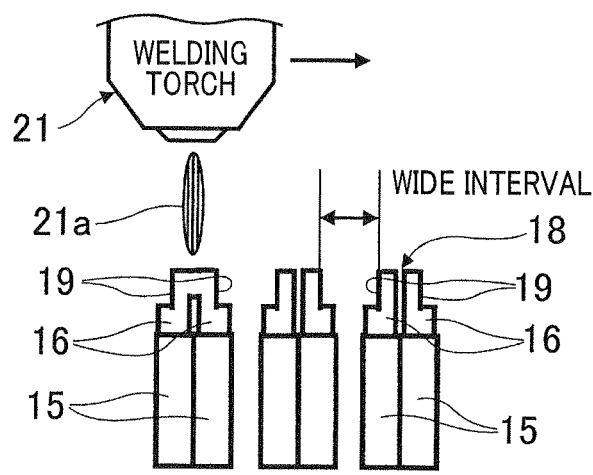
FIG. 8A is a schematic view illustrating an advantage of the stator according to the second embodiment.

Furthermore, as shown in FIG. 8A, with the sufficiently wide intervals between the radially-adjacent distal end pairs 18, in joining one of the distal end pairs 18 by arc welding, it is difficult for an electric arc 21a from a welding torch 21 to be short-circuited to another one of the distal end pairs 18 which is radially adjacent to the distal end pair 18. Consequently, it is possible to prevent the other distal end pair 18 from being accidently welded by the electric arc 21a.

Figure 8B:
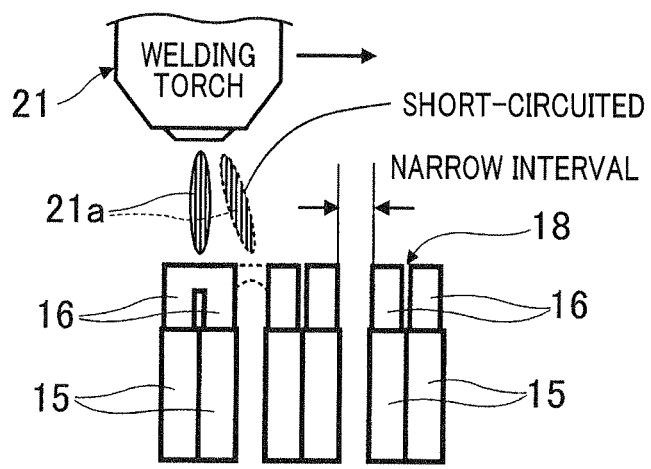
FIG. 8B is a schematic view illustrating a problem which a stator may have without the configuration of the electric conductor segments according to the second embodiment.

In comparison, as shown in FIG. 8B, in the case of the insulating coat-removed portions 16 having no cut 19 formed therein, it may be difficult to secure sufficiently wide intervals between the radially-adjacent distal end pairs 18. Consequently, without sufficiently wide intervals, in joining one of the distal end pairs 18 by arc welding, the electric arc 21a from the welding torch 21 may be short-circuited to another one of the distal end pairs 18 which is radially adjacent to the distal end pair 18. Consequently, it may be difficult to prevent the other distal end pair 18 from being accidently welded by the electric arc 21a.

While the above particular embodiments have been shown and described, it will be understood by those skilled in the art that various modifications, changes, and improvements may be made without departing from the spirit of the invention.

For example, in the previous embodiments, the stator coil 4 is formed by using the U-shaped electric conductor segments 7. However, the stator coil 4 may also be formed by using a plurality of S-shaped electric conductor segments as disclosed in Patent Document 2.

In the previous embodiments, the present invention is directed to the stator 1 for the automotive electric motor. However, the invention can also be applied to stators for other electric rotating machines, such as a stator for an electric generator and a stator for a motor-generator that can function both as an electric motor and as an electric generator.

What is claimed is:

1. A stator for an electric rotating machine, the stator comprising:
a hollow cylindrical stator core having a plurality of slots formed therein, the slots being spaced from one another in a circumferential direction of the stator core and each extending in an axial direction of the stator core so as to penetrate the stator core in the axial direction; and
a stator coil comprised of a plurality of electric conductor segments mounted on the stator core, each of the electric conductor segments having an insulating coat covering its outer surface and including, at least, an in-slot portion and an oblique portion, the in-slot portion being received in a corresponding one of the slots of the stator core, the oblique portion being connected to the in-slot portion and located outside of the slots of the stator core, the oblique portion being positioned axially outside of an axial end face of the stator core and extending obliquely with respect to the axial end face,
wherein
each of the electric conductor segments also has an insulating coat-removed portion from which the insulating coat is removed, the insulating coat-removed portion being positioned on the same axial side of the stator core as the oblique portion of the electric conductor segment,
each corresponding pair of the insulating coat-removed portions of the electric conductor segments are joined with a joint formed therebetween,
for each of the electric conductor segments, the oblique portion of the electric conductor segment is comprised of a first part and a second part,
the first part extends, along the circumferential direction of the stator core, obliquely with respect to the axial end face of the stator core with a first oblique angle $\theta_1$ formed between the first part and the axial end face, the second part extends, along the circumferential direction of the stator core, obliquely with respect to the axial end face of the stator core with a second oblique angle $\theta_2$ formed between the second part and the axial end face, the second oblique angle $\theta_2$ being greater than the first oblique angle $\theta_1$, and the second part is positioned closer to the joint, where the insulating coat-removed portion of the electric conductor segment is jointed to the insulating coat-removed portion of another electric conductor segment, than the first part is.

2. The stator as set forth in claim 1, wherein in each of the electric conductor segments, the second part of the oblique portion is positioned to include a distal end of the electric conductor segment, and the insulating coat-removed portion is formed at the distal end of the electric conductor segment.

3. The stator as set forth in claim 1, wherein for each of the oblique portions of the electric conductor segments, the first part of the oblique portion crosses over, at a crossover area, the first part of another one of the oblique portions of the electric conductor segments which is radially adjacent to the oblique portion.

4. The stator as set forth in claim 3, wherein in each of the electric conductor segments, the insulating coat-removed portion is formed so as to be away from the crossover area.

5. The stator as set forth in claim 4, wherein in each of the electric conductor segments, the insulating coat-removed portion is formed only within the second part of the oblique portion.

6. The stator as set forth in claim 1, wherein each pair of the electric conductor segments which are jointed together at the insulating coat-removed portions thereof are in contact with each other only at the insulating coat-removed portions.

7. The stator as set forth in claim 1, wherein each of the electric conductor segments is substantially U-shaped to include a pair of in-slot portions and a pair of oblique portions, the in-slot portions are respectively received in corresponding two of the slots of the stator core, and the oblique portions are respectively connected to the in-slot portions and both located on the same axial side of the stator core.

8. The stator as set forth in claim 1, wherein each of the electric conductor segments has a substantially rectangular cross-sectional shape, and each of the insulating coat-removed portions of the electric conductor segments has a smaller radial thickness at a part thereof for forming the joint than at the remaining part.

* * * * *